(12) United States Patent
Francisquini

(10) Patent No.: US 12,088,068 B2
(45) Date of Patent: Sep. 10, 2024

(54) WELDED BOARD AND STRUCTURE FOR ELECTRICAL CABINET

(71) Applicant: Melquisedec Francisquini, Sao Paulo II (BR)

(72) Inventor: Melquisedec Francisquini, Sao Paulo II (BR)

( * ) Notice: Subject to any disclaimer, the term of this patent is extended or adjusted under 35 U.S.C. 154(b) by 345 days.

(21) Appl. No.: 17/612,510

(22) PCT Filed: May 26, 2020

(86) PCT No.: PCT/BR2020/050181
§ 371 (c)(1),
(2) Date: Nov. 18, 2021

(87) PCT Pub. No.: WO2020/237335
PCT Pub. Date: Dec. 3, 2020

(65) Prior Publication Data
US 2022/0271512 A1 Aug. 25, 2022

(30) Foreign Application Priority Data
May 28, 2019 (BR) .............................. 102019010953

(51) Int. Cl.
*H02B 1/30* (2006.01)
*H02B 1/28* (2006.01)

(52) U.S. Cl.
CPC ................. *H02B 1/30* (2013.01); *H02B 1/28* (2013.01)

(58) Field of Classification Search
CPC ...... F16B 7/187; F16B 37/043; F16B 37/045; F16B 37/044; H02B 1/30; H02B 1/28; H02B 1/301; H02B 1/012; H02B 1/013; H02B 1/014
See application file for complete search history.

(56) References Cited

FOREIGN PATENT DOCUMENTS

CN 1374829 A * 10/2002 ............... H02B 1/01

OTHER PUBLICATIONS

CN 1374829 A (Translation) (Year: 2023).*

* cited by examiner

*Primary Examiner* — Hoa C Nguyen
*Assistant Examiner* — John B Freal
(74) *Attorney, Agent, or Firm* — Cowan, Liebowitz & Latman, P.C.; Mark Montague

(57) ABSTRACT

WELDED BOARD AND ELECTRICAL CABINET STRUCTURE presents a cabinet built with welded frames that use vertical and horizontal profiles, having an internal fastening wall with holes and cutouts to the fitting of a cage nut and an internal fastening tab, a side sealing surface, a front sealing surface and the isolation barrier, the structure being assembled with at least two welded frames, which are assembled in parallel and joined through four depth profiles, said depth profiles being joined directly to the welded frames vertices.

11 Claims, 12 Drawing Sheets

FIG. 12
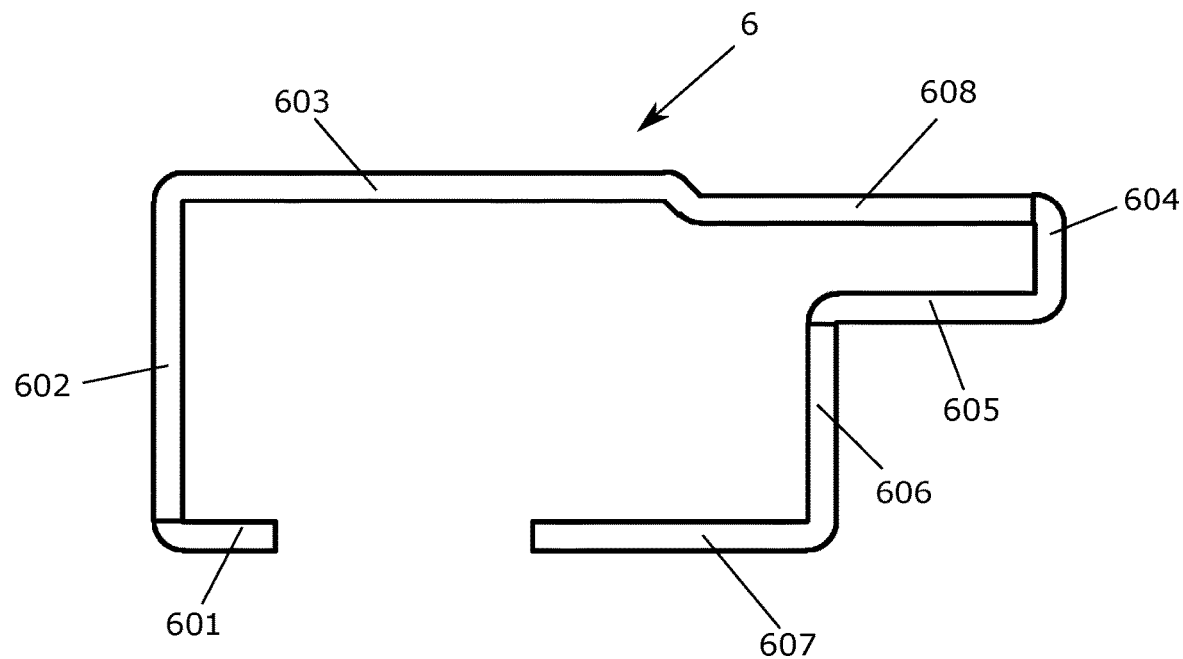
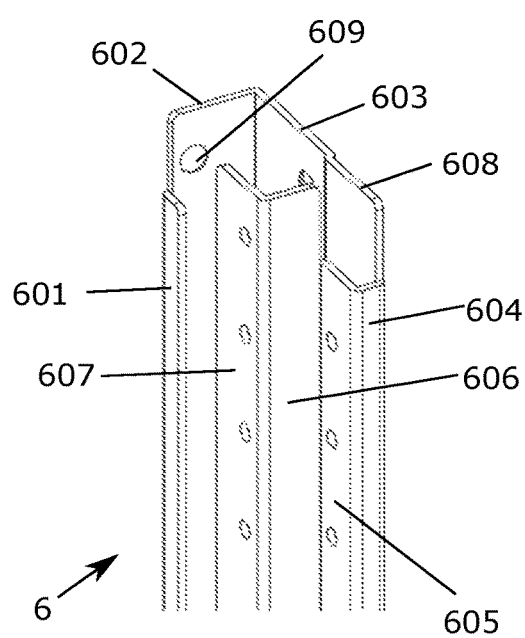
FIG. 13
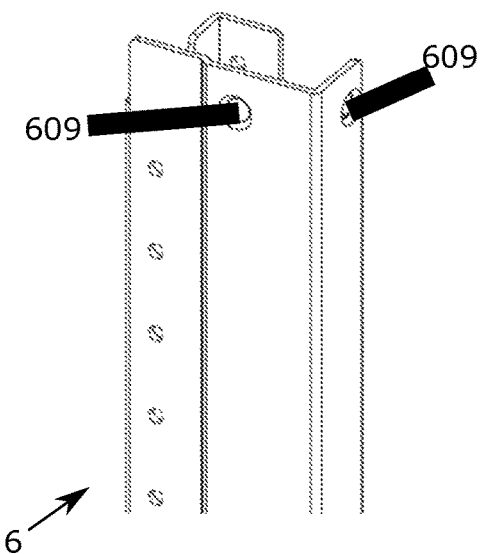
FIG. 14

FIG. 19
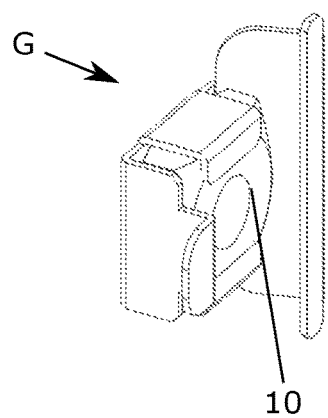
FIG. 20
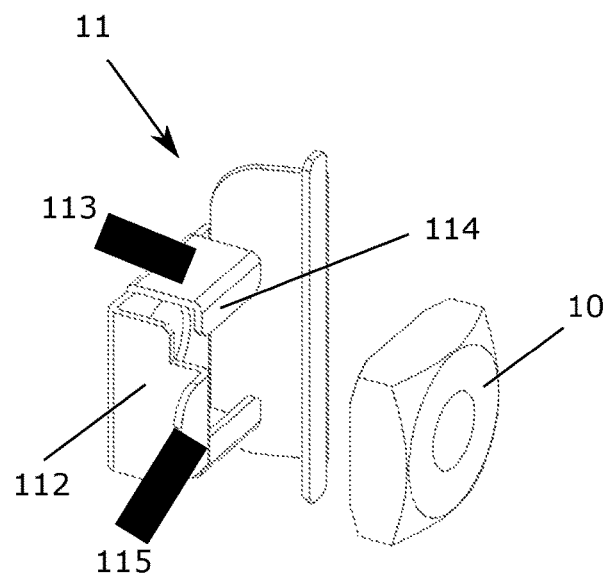
FIG. 21
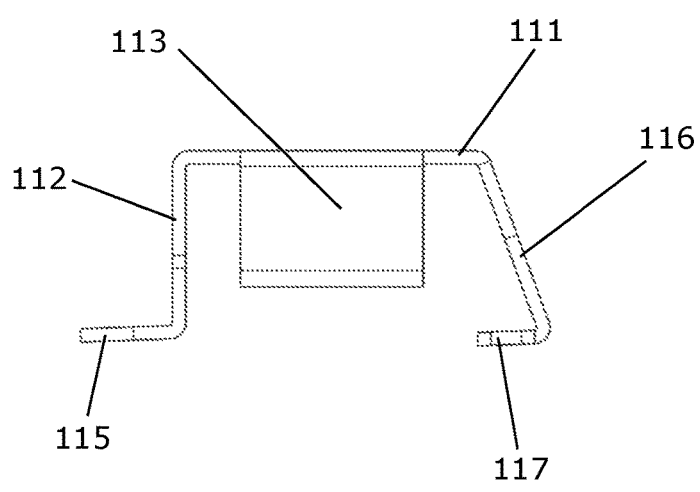
FIG. 22
117
114

WELDED BOARD AND STRUCTURE FOR ELECTRICAL CABINET

FIELD OF THE INVENTION

The present invention is comprised in the field of metal structures, more precisely in the field of metal structures to electrical cabinets and enclosures.

BACKGROUND OF THE INVENTION

Electrical cabinets and enclosures are widely used in industry. Their basic functions consist in providing a useful area for electrical and electronic component assembly, preventing non-permitted access by unauthorized people to these components and, in some cases, protecting such electrical and electronic components against dust and external moisture.

Several types of structure are used in the construction of electrical cabinets such as welded, merged, tubular and metal profile structures. Metal profiles and junction corners are presented as an important construction form, being quite used in cabinet manufacturing by presenting easy handling, since they are effortlessly transported and assembled in the installation site.

Some models of electrical cabinets need to present minimal isolation and sealing capacity such that they are able to prevent the entry of moisture or the spread of flames, if a short circuit occurs inside.

Another important feature in electrical cabinets is the occupied space. The greater the space occupied by the cabinet structure, the smaller the useful area for assembling electrical and electronic components. Thereby, in addition to meeting component assembling needs and providing a solid and stable structure, it is important that the cabinet is compact and provides the largest possible useful area.

The prior art presents electrical cabinets and metal profiles with different shapes and characteristics. Among them, one can cite those described in documents U.S. Pat. Nos. 6,231,142, 6,808,240, WO2003105552 and WO2015117597.

Document U.S. Pat. No. 6,231,142 presents a switch cabinet that uses a complex format profile, with several edges which makes its construction difficult. In addition, said cabinet presents several curves and changes in the direction of the sides of the profile, which occupy a large space and, consequently, make the useful area in the cabinet smaller. Another problem of the cabinet presented in that document is that its sealing can be compromised by the holes for fastening, which consequently can cause infiltrations.

Document WO2015117597 presents a cabinet that uses a quite simple profile, however, if it is made of bent sheet metal, there will be a need for welding to provide structural rigidity. Another problem of the cabinet in that document is in its sealing areas, which are narrow and can cause infiltrations. It is necessary to emphasize the structural fragility of said cabinet, which may lead to the need of using a larger profile, which consequently reduces the useful area inside the cabinet.

In this way, it is possible to confirm that the solutions presented in the prior art do not fully solve the condition of providing an easy-to-manufacture electrical cabinet structure at low cost, which presents excellent structural rigidity, with a greater useful area inside it and versatile fastening means that are easy to access and use.

BRIEF DESCRIPTION OF THE INVENTION

The present invention offers a frame and a structure to electrical cabinet composed of profiles able to offer excellent sealing, a new edge junction system with excellent structural rigidity and a greater useful area inside it, presenting a wide front opening, being easy to build and assemble, and providing versatile fastening means that are easy to access and use.

The first objective of the present invention is to provide an assembled welded frame using vertical and horizontal profiles and lifting brackets.

An objective of the present invention is to provide a structure for electrical cabinet that presents excellent rigidity and structural stability, with a low manufacturing cost.

Another objective of the present invention is to provide a structure for electrical cabinet that is easy to build and assemble.

It is also an objective of the present invention to provide a structure for an electrical cabinet that facilitates and improves the assembly and installation of electrical components inside it.

It is also an objective of the present invention to provide a structure for an electrical cabinet that has a greater front opening and a smaller occupation of space, increasing the useful assembly area.

Finally, it is an objective of the present invention to provide a structure for electrical cabinet capable of presenting a high degree of isolation between its internal and external areas.

BRIEF DESCRIPTION OF THE DRAWINGS

The subject matter of this specifications will be totally evident in its technical aspects from the detailed description that will be made based on the figures listed below, in which:

FIG. 12 shows a top view of an embodiment of the depth profile;

FIG. 13 shows a perspective view of an embodiment of the depth profile, as shown in FIG. 12;

FIG. 14 shows a rear perspective view of an embodiment of the depth profile, according to FIGS. 12 and 13;

FIG. 19 shows a perspective view of the cage nut;

FIG. 20 shows an exploded perspective view of the cage nut;

FIG. 21 shows a side view of the support belonging to the cage nut;

FIG. 22 shows a bottom view of the support belonging to the cage nut;

DETAILED DESCRIPTION OF THE INVENTION

Figure 1:
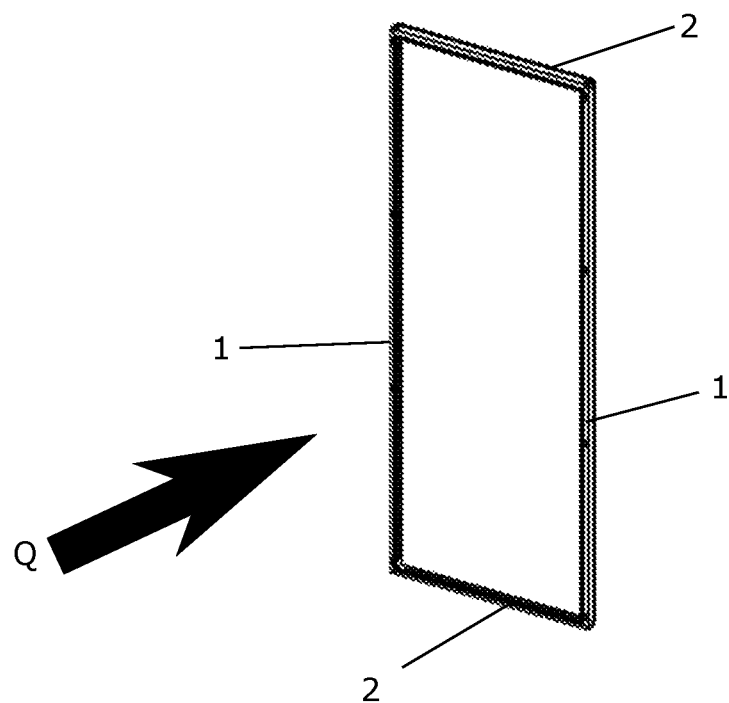
FIG. 1 shows a perspective view of the welded frame.
Figure 2:
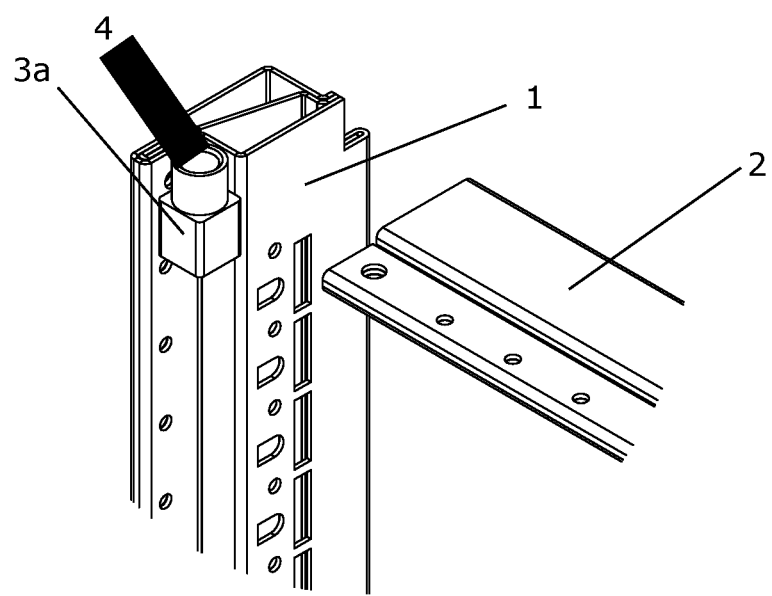
FIG. 2 shows a detail of an exploded perspective view of the horizontal and vertical profiles and the lifting bracket, in an embodiment of the welded frame assembly, in which the vertical and horizontal profiles present a straight cut at their end and a lifting element is used with a cylindrical recess fixed to the quadruple tab of the two profiles.
Figure 3:
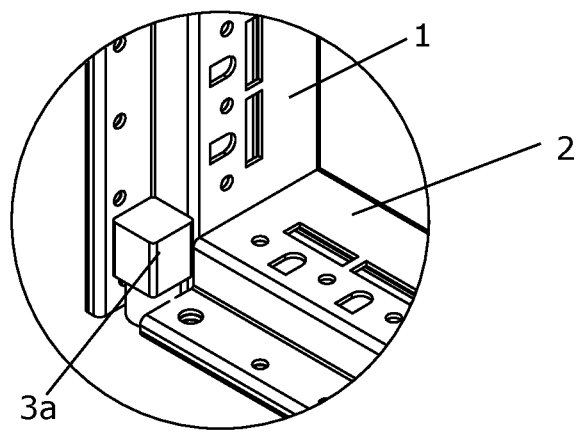
FIG. 3 shows a detail of a perspective view of an inner portion in an embodiment of the welded frame assembly according to FIG. 2.
Figure 4:
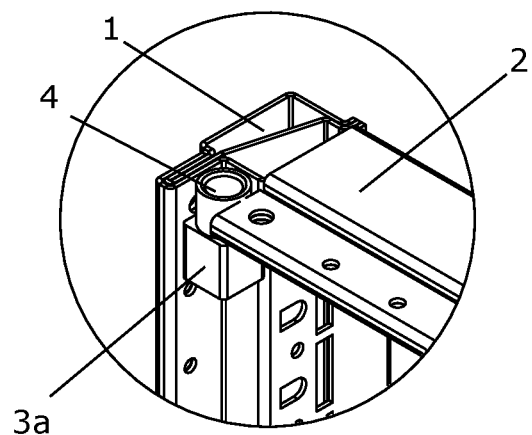
FIG. 4 shows a detail of a perspective view of an embodiment of the welded frame assembly according to FIGS. 2 and 3.
Figure 5:
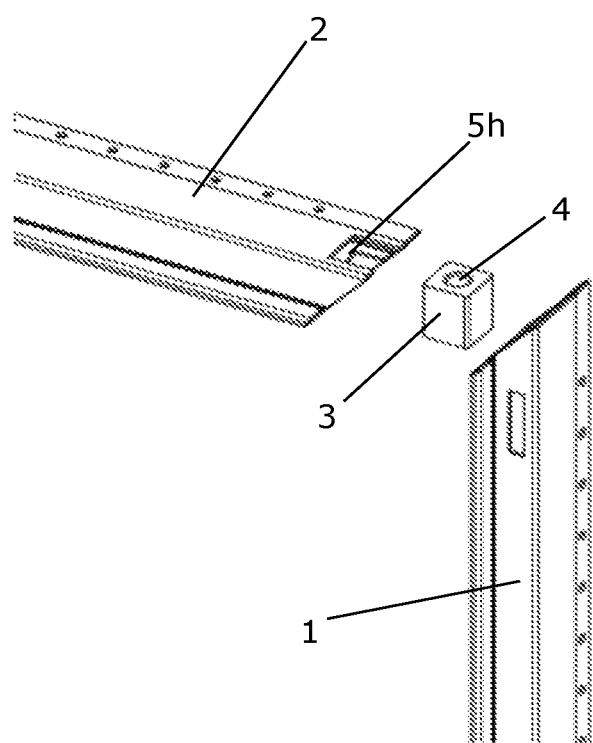
FIG. 5 shows a detail of an exploded perspective view of an embodiment of the welded frame assembly with vertical and horizontal profiles with 45° cut, and a cutout in the horizontal profile for accommodation of the lifting bracket.
Figure 6:
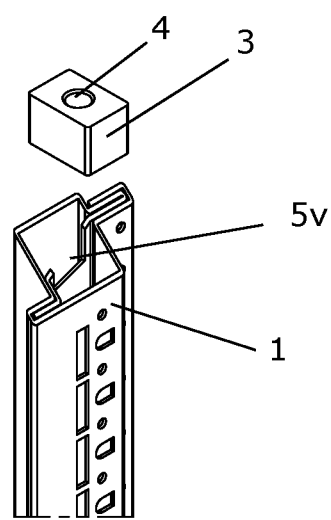
FIG. 6 shows a detail of an exploded perspective view of an embodiment of the welded frame assembly with the vertical profile cut at 45°, and a cutout in the vertical profile for accommodating the lifting bracket.
Figure 7:
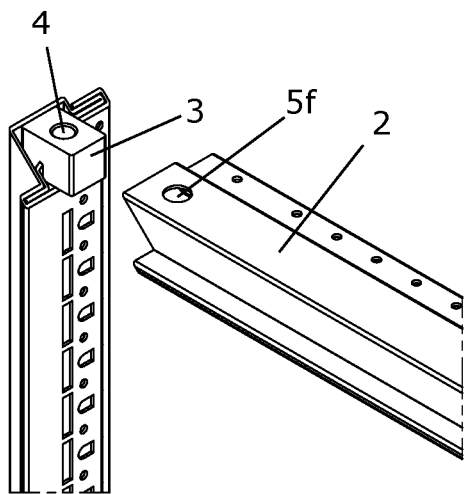
FIG. 7 shows a detail of an exploded perspective view of an assembly form of the welded frame, with the support already positioned in the vertical profile and with a hole in the horizontal profile that aligns with the threaded hole of the lifting bracket.
Figure 8:
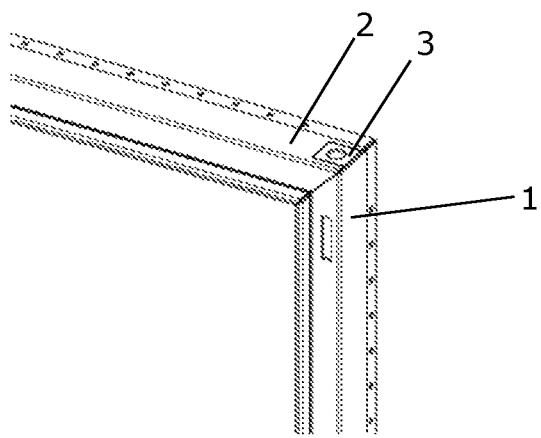
FIG. 8 shows a detail of a perspective view of an assembly form of the welded frame according to FIG. 5.

In accordance with the aforementioned figures, the present invention "WELDED BOARD AND STRUCTURE FOR ELECTRICAL CABINET" consists of a structure (E) that comprises at least two welded frames (Q), and four depth profiles (6), used in an electrical cabinet assembly (A).

The welded frame (Q) is assembled by using two vertical profiles (1), two horizontal profiles (2) and four lifting brackets (3). Said lifting brackets (3) are essentially a metal block that has a non-passing threaded hole (4). The lifting brackets (3) are at the vertex region of the welded frame (Q), with the hole in a vertical position facing the outside.

The vertical and horizontal profiles (1 and 2) are built according to the patent application "STRUCTURAL PROFILE FOR ELECTRIC CABINET" by Melquisedec Francisquini, filed in May/2019. Said profile, has a format and structure that makes a smaller width possible, thus providing a greater front opening (AF) which, consequently, offers more useful space inside the cabinet. In addition, said profile presents isolation between the internal and external areas. Such vertical and horizontal profiles (1 and 2) present an internal fastening wall (101), with fastening means that comprise a plurality of holes that may be circular, square, rectangular or a combination thereof. Said internal fastening wall (101), together with the fitting tab (102), are used for fastening the necessary components inside the cabinet (A). A side sealing surface (103), a front sealing surface (104) and the isolation barrier (105), promote the isolation between the outer area (AE) and inner area (AI). Two external fastening sides (106) with fastening means comprising a plurality of holes that may be circular, square, rectangular or a combination thereof, are used for fastening external elements and cabinet panels (A).

In an embodiment of the present invention, the welded frame (Q) is assembled in a way that the end of the horizontal profile (2) touches the inner face of the vertical profile (1), close to its end, forming an angle of 90° between the two profiles (1 and 2). A lifting bracket (3a), which has a cylindrical recess at the top to facilitate welding, is attached to the quad-layer flaps of the vertical and horizontal profiles (1 and 2). If necessary, a cover is used to close the upper portion of the vertical profile (1). The union between the vertical and horizontal profiles (1 and 2) and lifting bracket (3a) is preferably carried out by welding.

In another embodiment of the present invention, the welded frame (Q) is assembled with the vertical profile (1) and the horizontal profile (2) having their ends cut at an angle of 45° so that, when joined, they form an angle of 90° with each other. At each frame vertex there is a lifting bracket (3), which has essentially parallelepiped shape. Said lifting bracket (3) has a threaded hole (4) in vertical position and facing the outside of the frame. To accommodate the lifting bracket (3), it is possible to perform a horizontal cutout (5h) or a lifting hole (5f) in the horizontal profile (2), and/or a cutout (5v) in the vertical profile (1). The union between the vertical and horizontal profiles (1 and 2) and the lifting bracket (3) is preferably made by welding.

At least two welded frames (Q) are assembled in parallel and joined through four depth profiles (6), said depth profiles (6) are joined to the vertices of the welded frames (Q), thus forming the structure (E) of cabinet (A). The depth profiles (6) are preferably bolted to the welded frames (Q) and can also be welded.

In an embodiment of the present invention, the depth profile (6) has an outer wall (602) that is connected to a base wall (603), forming an angle of 90° with each other. Said base wall (603) is parallel to the fastening wall (608), whose tabs are slightly misaligned, forming a step between them. Said fastening wall (608) is connected to a junction wall (604) forming an angle of 90°. Such junction wall (604) is parallel to the outer wall (602). Said junction wall (604) is connected to a support wall (605), forming an angle of 90° with each other. Such support wall (605) is parallel to the base wall (603) and goes towards the front wall (602). The fastening wall (608) and the support wall (605) have fastening holes, preferably aligned with each other. Said support wall (605) is connected to the rear wall (606), forming an angle of 90° with each other. Such rear wall (606) is parallel to the front wall (602) going away from the base wall (603). Said rear wall (606) is connected to the fastening tab (607), which is parallel to the base wall (603) and goes towards the front wall (602). Said fastening tab (607) has holes for fastening. In the same plane of the fastening tab (607) is the reinforcing tab (601), with a gap between them.

Said reinforcing tab (601) is connected to the front wall (602), forming an angle of 90° with each other. A cutout in the junction wall (604), the front wall (605) and the reinforcing tab (601) provide fit and alignment of surfaces and edges in the assembly with the vertical and horizontal profiles (1 and 2) of the welded frame (Q) in order to maintain the sealing ability of the structure. The depth profile (6) is preferably built in folded sheet.

In other embodiments of the present invention, other forms of profile can be used as depth profile (6), including the horizontal profile (2).

A cage nut (G) can be assembled on the welded frame (Q) for the fastening of internal accessories and/or components and external closure panels (FE). The advantage of using the cage nut is its easy installation, the non-use of welding, and the free access only to the face where the component will be installed, thus avoiding the need for access to an internal area for the installation of an external component, by example. In addition, the cage nut (G) is convenient to change the position of a component when necessary.

Said cage nut (G) comprises a bracket (11) and a nut (10), such nut (10) is preferably square. Said bracket (11) consists of a structure preferably made of bent sheet metal, so that the nut (10) is fastened inside. Such bracket (11) has a support base (111) that has a hole for the passage of the screw, said hole being aligned with the threaded hole of the nut (10). A front restraint (112) and two lateral restraints (113) are connected to the support base (111) and prevent the nut (10) from turning inside the bracket (11). A nut locking tab (114) is connected to each of the lateral restraints (113) and prevents the nut (10) from coming out from the bracket interior (11). Said bracket (11) has a front fastening tab (115) that is connected to the front restraint (112) and faces the external portion of the bracket (11). Opposite the front restraint (112) is the positioning tab (116), which is slightly tilted away from the bracket center (11). Said positioning tab (116) has greater width than the nut (10). Attached to the positioning tab (116) is the rear tab (117), which goes towards the bracket front portion (11) and is in the same plane as the front fastening tab (115). Said rear tab (117) has greater width than the positioning tab (116).

Figure 24:
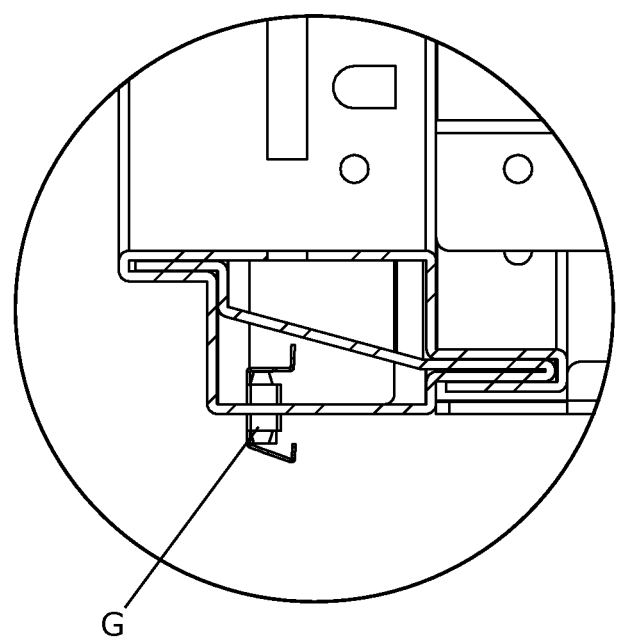
FIG. 24 shows a detail of a cross-sectional top view of the structure, with the cage nut being inserted through the rectangular hole of a vertical profile.
Figure 25:
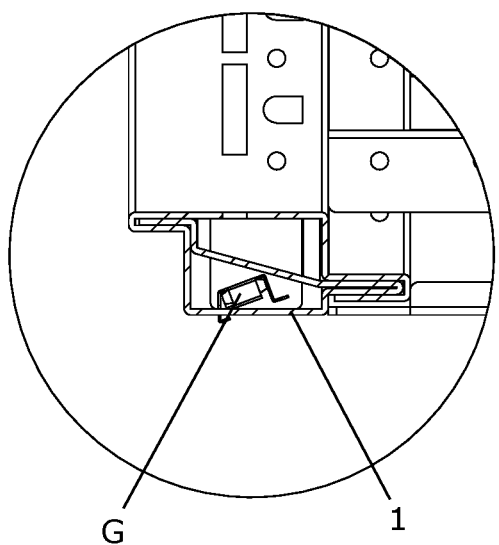
FIG. 25 shows a detail of a cross-sectional top view of the structure, with the cage nut being turned so that the front fastening tab is inserted in the semi-oblong.
Figure 26:
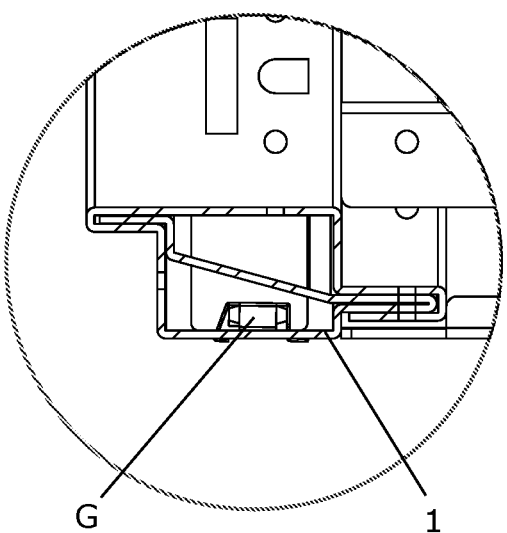
FIG. 26 shows a detail of a cross-sectional top view of the structure, with the cage nut installed.
Figure 27:
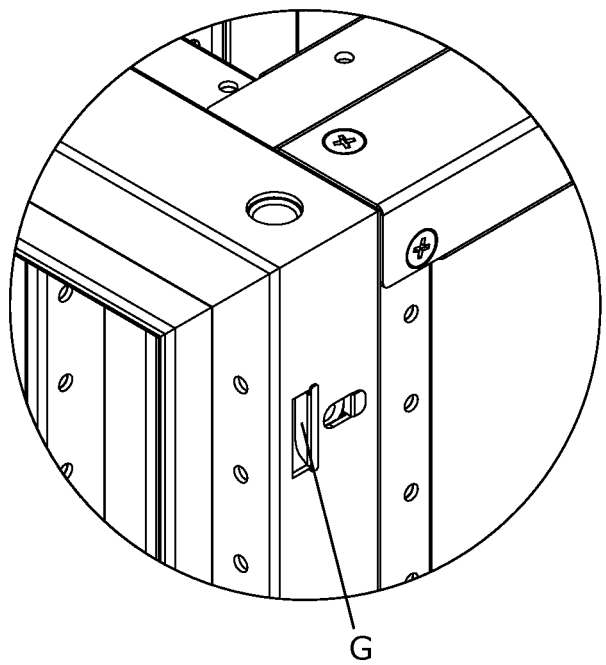
FIG. 27 shows a detail of a perspective view of the structure with the cage nut installed.

The vertical or horizontal profile (1 or 2) has a set of holes that are used for fitting the cage nut (G). Such set of holes consists of a rectangular hole (12) and a semi-oblong hole (13) which has the end close to the rectangular hole (12) domed and the opposite end straight. Said rectangular hole (12) has sufficient dimensions for the cage nut entrance, except for the rear tongue (117). The semi-oblong hole (13) has sufficient dimensions for the entry of the front fastening tab (115). The fitting of the cage nut (G) in the vertical or horizontal profile (1 or 2), occurs with the cage nut (G) being inserted through the rectangular hole (12), first inserting the front fastening tab (115), with the exposed face of the nut (10) facing the semi-oblong (13), as seen in FIG. 24, except for the rear tongue (117) which has a larger dimension, even than the rectangular hole (12) diagonal. Then, the cage nut (G) is turned so that the front fastening tab (115) is inserted into the semi-oblong hole (13), as seen in FIG. 25. Afterwards, the cage nut (G) is pushed so that the front fastening tab (115) locks into the profile surface as seen in FIGS. 26 and 27.

Figure 9:
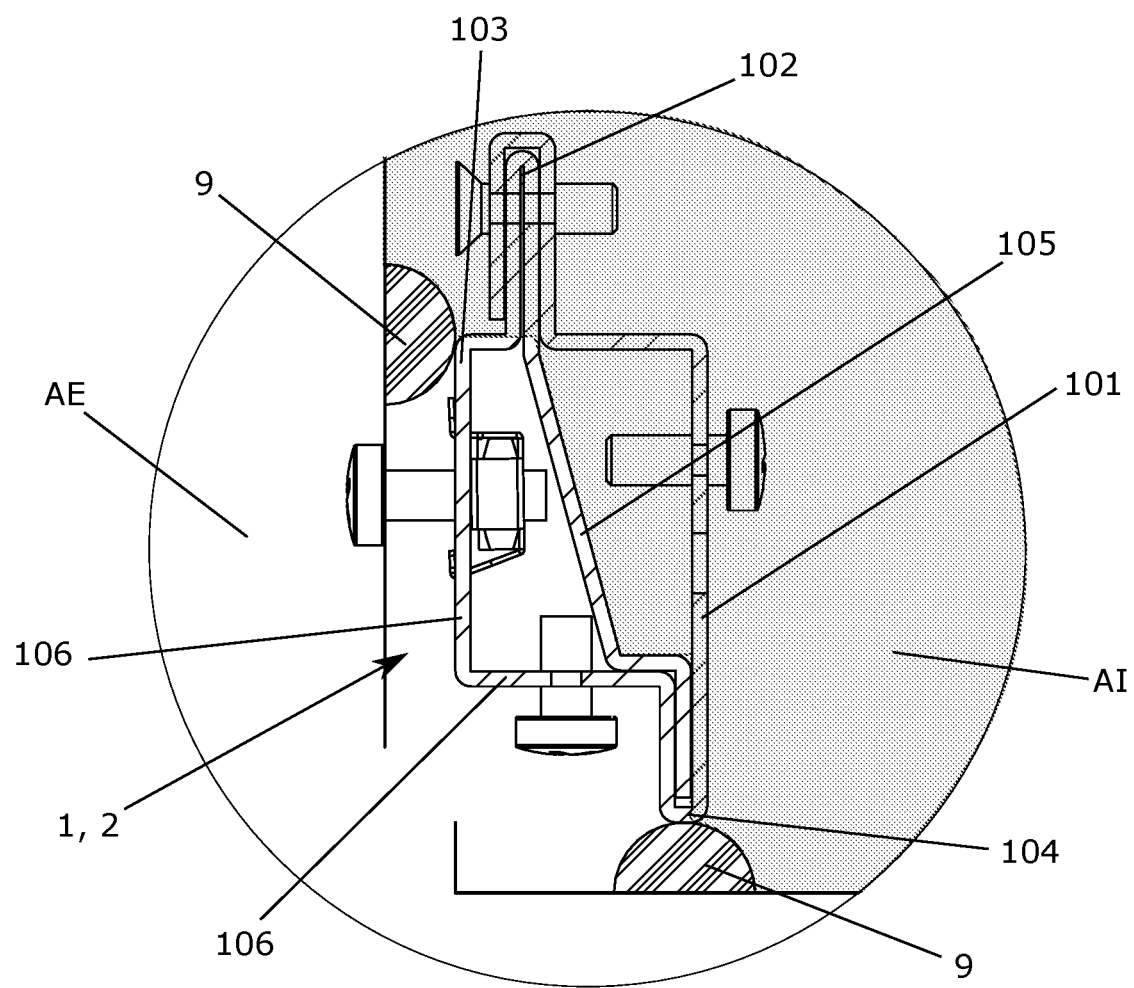
FIG. 9 shows a detail of a cross-sectional top view of an assembly example of the electrical cabinet with isolating elements, in addition to the use of the cage nut to fasten the side panel and the division between internal and external area promoted by the vertical profile.
Figure 10:
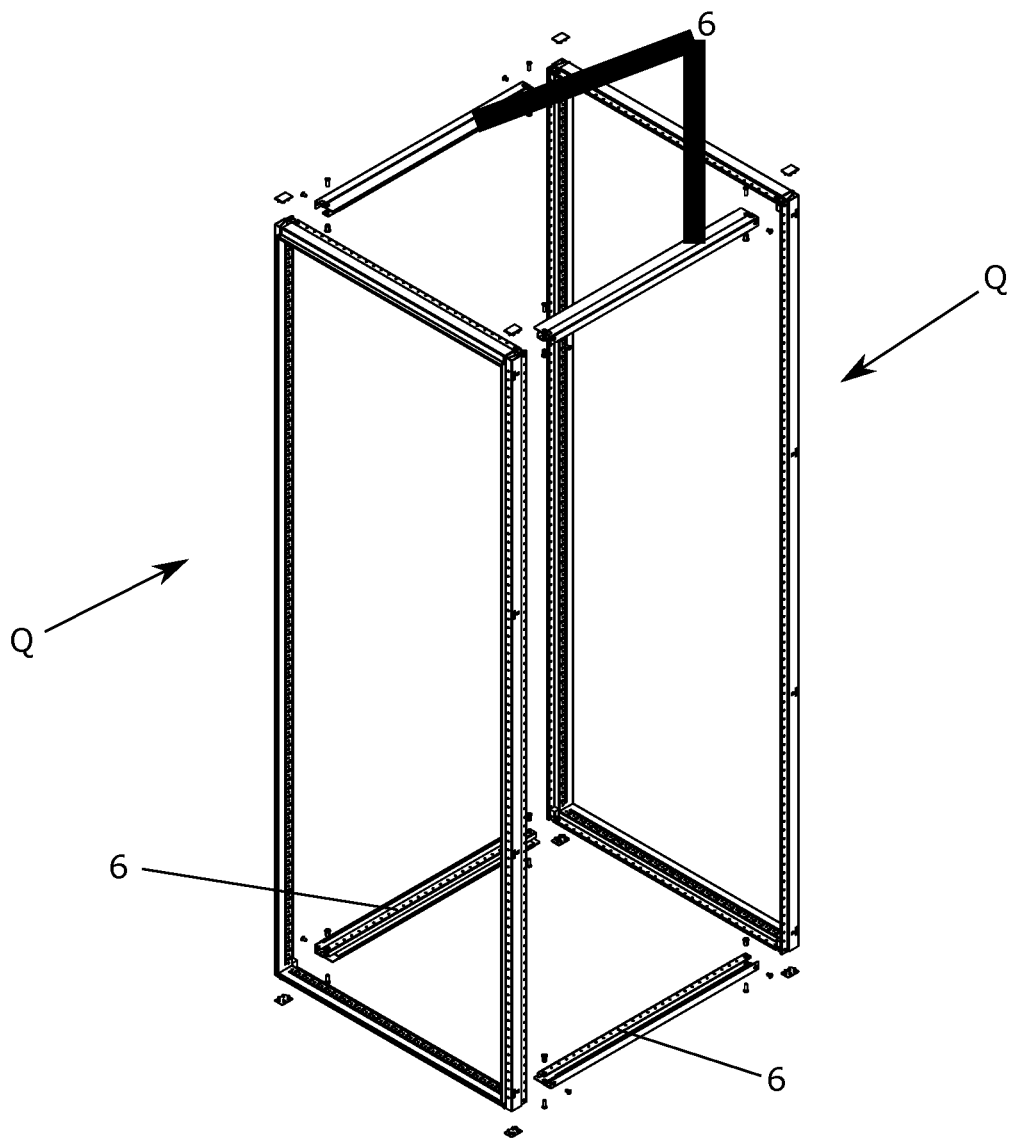
FIG. 10 shows an exploded perspective view of an assembly form of two welded frames and four depth profiles to form the structure for electrical cabinet.
Figure 11:
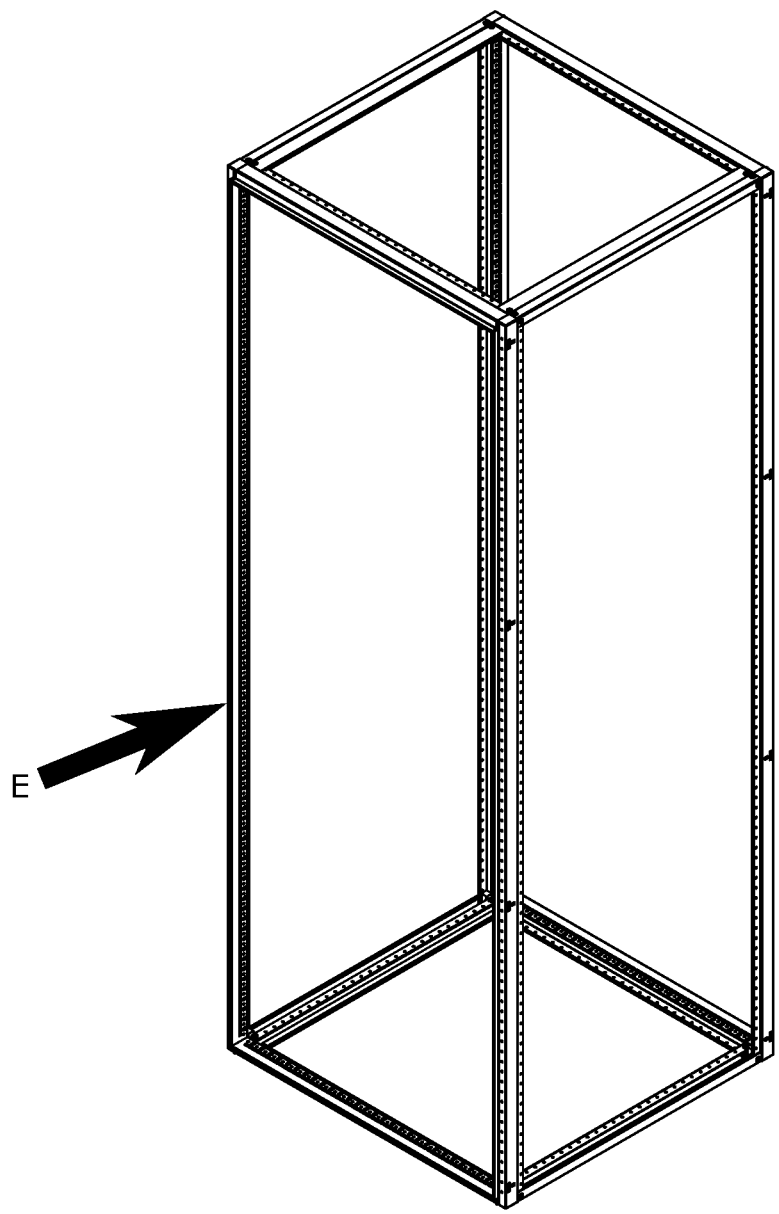
FIG. 11 shows a perspective view of the structure for electrical cabinet.
Figure 15:
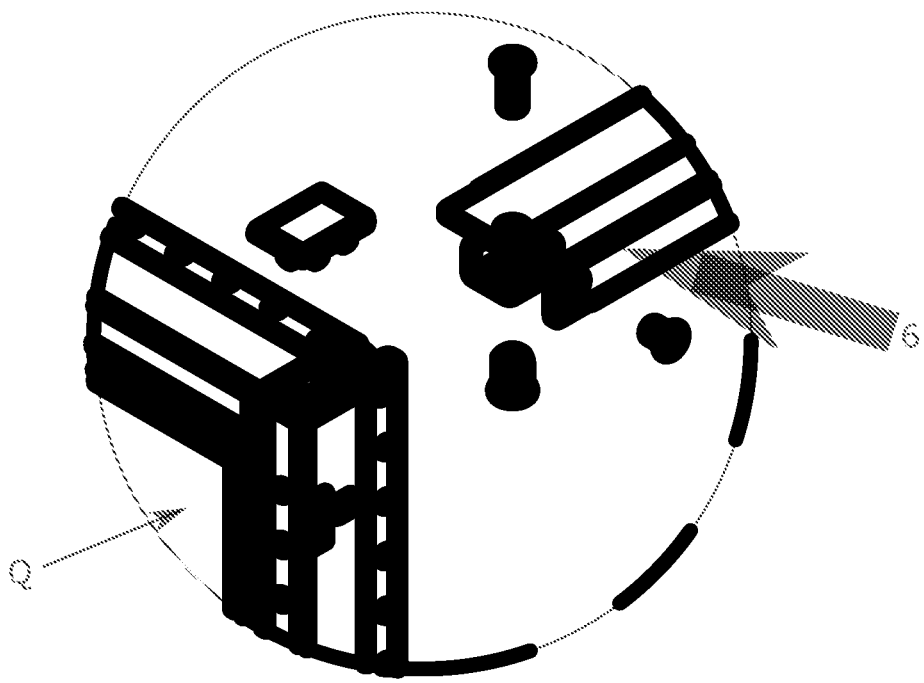
FIG. 15 shows a detail of an exploded perspective view of a depth profile assembly according to FIGS. 12, 13 and 14 in a welded frame.
Figure 16:
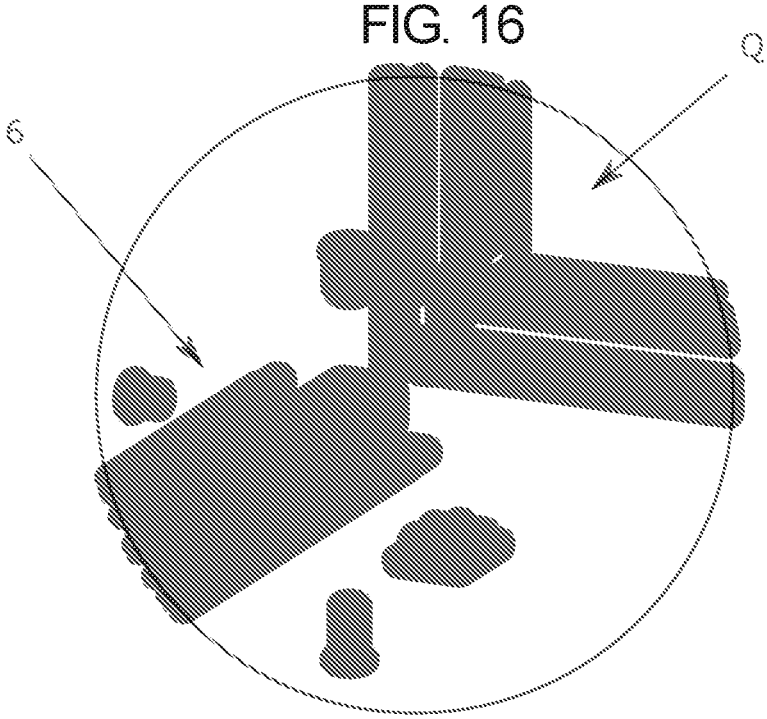
FIG. 16 shows a detail of an exploded perspective view, as shown in FIG. 15, of the internal part of a depth profile assembly according to FIGS. 12, 13 and 14 in a welded frame.
Figure 17:
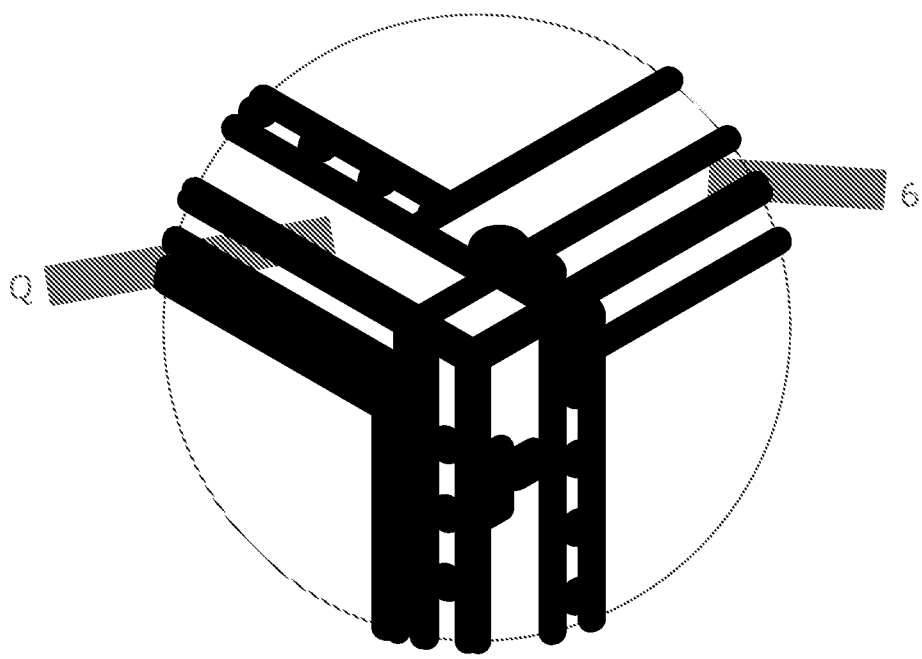
FIG. 17 shows a detail of a perspective view of the depth profile assembly in a welded frame, according to FIGS. 15 and 16.
Figure 18:
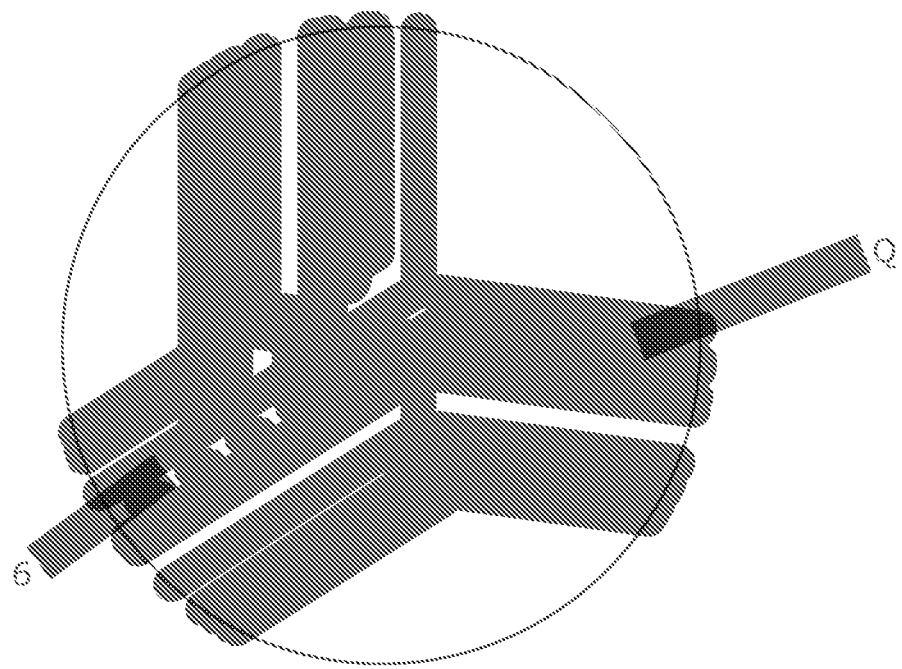
FIG. 18 shows a detail of a perspective view of the inner portion of the depth profile assembly in a welded frame according to FIG. 17.
Figure 23:
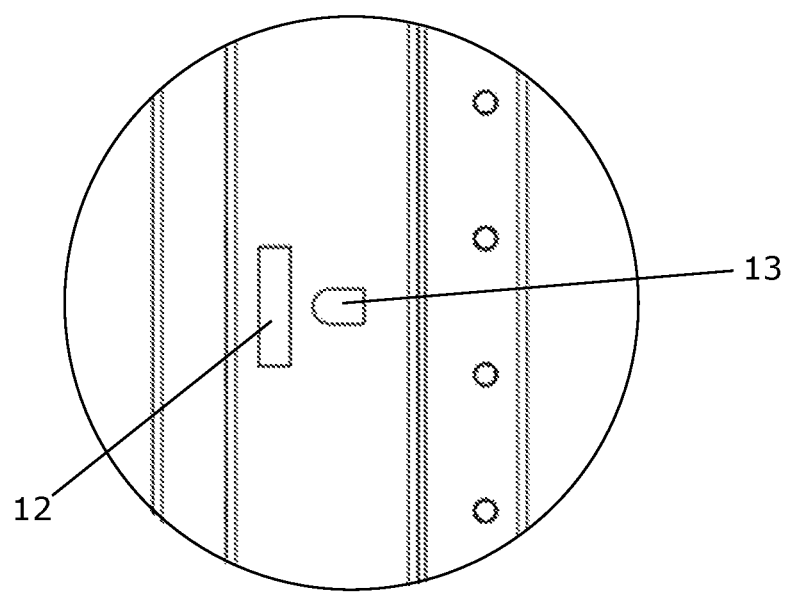
FIG. 23 shows a set of rectangular and semi-oblong holes in which the cage nut is installed.
Figure 28:
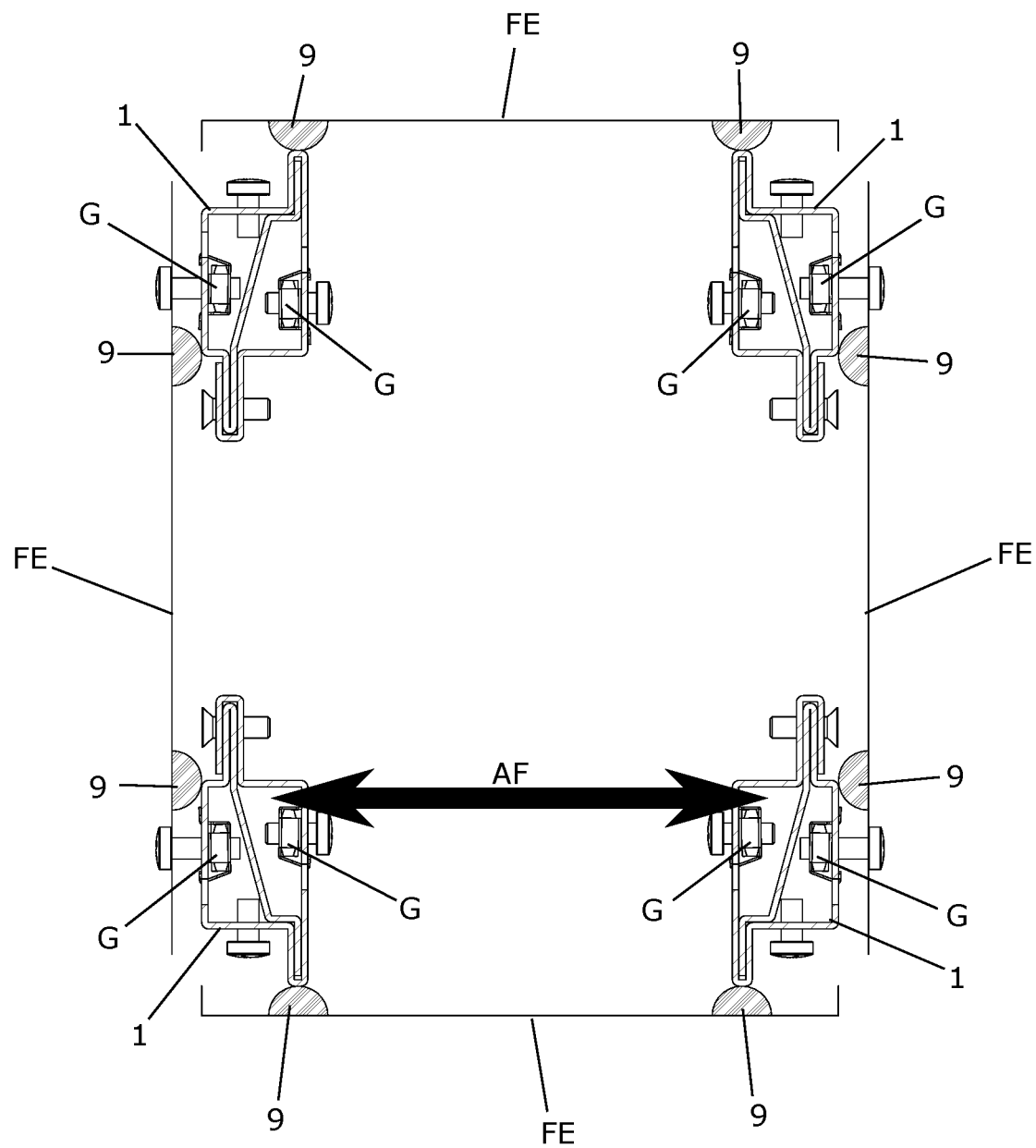
FIG. 28 shows a cross-sectional view of an assembly example of the closing panels on the structure, using cage nuts and sealing elements, and it is possible to observe the front opening offered by the structure.

In an embodiment of the present invention, the external closure panels (FE) use a sealing element (9) to assist in the isolation between the internal area (AI) and external area (AE). Said sealing element (9) is preferably flexible like a rubber, EVA, silicone or similar materials. The fastening means of the external closure panels, such as the cage nut (G), are in the portion defined as the external area, thus there is no communication between the external area and the internal area, as seen in FIG. 9 and FIG. 28.

The main advantages of the present invention are to provide a structure for electrical cabinet with excellent structural rigidity, with several fastening options, including fastening through the cage nut, with a front opening that allows a greater useful area inside the cabinet, in addition to presenting simple and easy assembly, even in the field.

It should be understood that the present specification does not limit the application to the details described herein and the invention is capable of other embodiments and should be practiced or performed in a variety of ways, within the scope of the claims. Although specific terms have been used, these terms should be construed in a generic and descriptive sense, and not for the purpose of limitation.

The invention claimed is:

1. A WELDED BOARD that uses vertical and horizontal profiles, presenting an internal fastening wall and a fitting tab, a side sealing surface, a front sealing surface, an isolation barrier and two external fastening sides characterized in that a welded frame (Q) is assembled using two vertical profiles, two horizontal profiles and four lifting brackets;

wherein said lifting brackets are at the vertex region of the welded frame (Q), with a hole in a vertical position facing the outside; being that the vertical and horizontal profiles have at least one set of holes in which cage nuts (G) can be assembled; and wherein said cage nut (G) comprises a bracket and a nut.

2. The WELDED BOARD according to claim 1, characterized in that the welded frame (Q) is assembled in a way that the end of the horizontal profile touches the inner face of the vertical profile, close to its end, forming an angle of 90° between the two profiles; the lifting bracket which has a cylindrical recess at the top, has a threaded hole in vertical position and facing the outside of the frame; said lifting bracket is attached to quad-layer flaps of the vertical and horizontal profiles.

3. The WELDED BOARD according to claim 1, characterized in that the welded frame (Q) is assembled with the vertical profile and the horizontal profile having their ends cut at an angle of 45° so that, when joined, they form an angle of 90° with each other and in each frame vertex there is a lifting bracket, which has parallelepiped shape and said lifting bracket has a threaded hole in vertical position and facing the outside of the frame; the horizontal profile has a horizontal cutout or a lifting hole, or a cutout in the vertical profile.

4. The WELDED BOARD according to claim 1, characterized in that the welded frame (Q) has a union between the vertical and horizontal profiles, and the lifting bracket is made by welding.

5. The WELDED BOARD according to claim 1, characterized in that the set of holes for fitting the cage nut (G) of the vertical or horizontal profile consists of a rectangular hole and a semi-oblong hole which has the end close to the rectangular hole domed and the opposite end straight; said rectangular hole has sufficient dimensions for the cage nut entrance, except for the rear tongue, and the semi-oblong hole has sufficient dimensions for the entry of an front fastening tab.

6. The WELDED BOARD according to claim 1, characterized in that the cage nut (G) is assembled on a structure (E) on the same face of the profile where a bolting takes place for the fastening of accessories and internal components and/or external closure panels (FE).

7. The WELDED BOARD according to claim 6, characterized in that said nut is preferably square; said bracket consists of a structure made of bent sheet metal, so that the nut is fastened inside; such bracket has a support base that has a hole for the passage of the screw, said hole being aligned with the threaded hole of the nut; a front restraint and two lateral restraints are connected to the support base and prevent the nut from turning inside the bracket; a nut locking tab is connected to each of the lateral restraints and prevents the nut from coming out from the bracket interior; said bracket has a front fastening tab that is connected to the front restraint and faces the external portion of the bracket; opposite the front restraint is a positioning tab, which is slightly tilted, away from the bracket center; said positioning tab has greater width than the nut; attached to the positioning tab is a rear tab, which goes towards the bracket front portion and is in the same plane as the front fastening tab; said rear tab has greater width than the positioning tab.

8. An ELECTRICAL CABINET STRUCTURE characterized in that a structure (E) is assembled with at least two welded frames (Q) assembled in parallel and joined through four depth profiles; wherein the said depth profiles are directly joined to the vertices of the welded frames (Q), being fitted on a fitting tab of vertical and horizontal profiles;
wherein each of the depth profiles has an outer wall that is connected to a base wall, forming an angle of 90° with each other and wherein said base wall is parallel to a fastening wall, whose tabs are slightly misaligned, forming a step between said base wall and said fastening wall.

9. The STRUCTURE according to claim 8, characterized in; said fastening wall is connected to a junction wall forming an angle of 90°; such junction wall is parallel to the outer wall; said junction wall is connected to a support wall, forming an angle of 90° with each other, such support wall is parallel to the base wall and goes towards a front wall; the fastening wall and the support wall have fastening holes aligned with each other; said support wall is connected to the rear wall, forming an angle of 90° with each other, such rear wall is parallel to the front wall going away from the base wall; said rear wall is connected to a fastening tab, which is parallel to the base wall and goes towards the front wall; said fastening tab has holes for fastening; in the same plane of the fastening tab is a reinforcing tab, with a gap between them; said reinforcing tab is connected to the front wall, forming an angle of 90° with each other; a cutout in the junction wall, the front wall and the reinforcing tab provide fit in the assembly with vertical and horizontal profiles of the welded frame (Q).

10. The STRUCTURE according to claim 8, characterized in that the depths profiles are bolted directly on the vertices of the welded frames (Q), being fitted on the fitting tab of the vertical and horizontal profiles.

11. The STRUCTURE according to claim 8, characterized in that the depths profiles are welded directly on the vertices of the welded frames (Q), being fitted on the fitting tab of the vertical and horizontal profiles.

* * * * *